United States Patent
Nakawatase et al.

(10) Patent No.: US 8,806,645 B2
(45) Date of Patent: Aug. 12, 2014

(54) IDENTIFYING RELATIONSHIPS BETWEEN SECURITY METRICS

(75) Inventors: Ryan Nakawatase, Laguna Hills, CA (US); Stephen Ritter, Wilsonville, OR (US); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 353 days.

(21) Appl. No.: 13/078,440

(22) Filed: Apr. 1, 2011

(65) Prior Publication Data

US 2013/0247203 A1  Sep. 19, 2013

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06F 21/57 | (2013.01) |

(52) U.S. Cl.
CPC .............. *H04L 63/14* (2013.01); *G06F 21/577* (2013.01)
USPC ........................................................ 726/25

(58) Field of Classification Search
CPC ..... H04L 63/14; G06F 21/50; G06F 11/3447; G06F 11/3452; G06Q 10/063
USPC .............................. 726/22–25; 705/7.11–7.42
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 6,742,128 | B1 * | 5/2004 | Joiner ............................ 726/25 |
| 7,506,155 | B1 | 3/2009 | Stewart et al. |
| 7,519,860 | B2 * | 4/2009 | Hatonen et al. ................. 726/23 |
| 8,145,456 | B2 * | 3/2012 | Cherkasova et al. ............. 703/2 |
| 8,539,588 | B2 * | 9/2013 | Tada et al. ....................... 726/25 |
| 2006/0010164 | A1 * | 1/2006 | Netz et al. ................. 707/104.1 |
| 2006/0242706 | A1 * | 10/2006 | Ross ............................... 726/23 |
| 2009/0064025 | A1 * | 3/2009 | Christ et al. .................. 715/772 |
| 2009/0281845 | A1 * | 11/2009 | Fukuda et al. .................... 705/7 |

OTHER PUBLICATIONS

Directions in Security Metrics Research Wayne Jansen Computer Security Division Information Technology Laboratory National Institute of Standards and Technology Gaithersburg, MD 20899-8930 Apr. 2009.*

* cited by examiner

*Primary Examiner* — Cordelia Zecher
*Assistant Examiner* — Vadim Savenkov
(74) *Attorney, Agent, or Firm* — Patent Capital Group

(57) ABSTRACT

A security metrics system receives security information data for a network system of computers and metric definitions from metric sources. Each metric definition defines a heuristic for calculating a score for the network system from one or more security signal values at a time in the plurality of times, wherein the score quantifies a security metric for the network system. The system calculates each metric definition for a plurality of times and selecting metric definitions that are related to the performance of and are indicative of one or more other metric definitions as candidates to be key performance indicators.

21 Claims, 9 Drawing Sheets

IDENTIFYING RELATIONSHIPS BETWEEN SECURITY METRICS

BACKGROUND

This specification relates to identifying relationships between security metrics that estimate the security of a system of assets.

Each asset in a system of assets is a computer or other electronic device. A system of assets can be connected over one or more networks. For example, a home might have five assets, each of which are networked to each other and connected to the outside world through the Internet. As another example, a business might have three physically separate offices, each of which has many assets. The assets within each office and the assets across the offices can be connected over a network.

The security of a system of assets is derived from the risk that threats could attack different assets in the system. Each asset in the system of assets can be at risk from multiple threats at any given time. Each threat corresponds to a potential attack on the asset by a particular virus, malware, or other unauthorized entity. An attack occurs when the unauthorized entity exploits a known vulnerability of the asset in an attempt to access or control the asset. Some threats have known remediations that, if put in place for an asset, eliminate or reduce the risk that the threat will affect the asset. Some threats do not have known remediations.

The large number of threats and possible ways to remediate the threats can make it difficult for a system administrator to have a comprehensive view of the security on a given system. System administrators can use one or more of a large number of possible security metrics to quantify overall risk present in a system. However, security monitoring products often restrict which security metrics a security administrator can view. This can make it difficult for security administrators to develop a comprehensive view of system security that is tailored to the details of and requirements for their systems. Even if system administrators could use any security metric they wanted to when evaluating the security of their systems, it is difficult for system administrators to know which security metrics will provide the best overall picture of the security of their system.

SUMMARY

In general, one innovative aspect of the subject matter described in this specification can be embodied in methods that include the actions of receiving security information data from each of a plurality of data sources for a network system of computers, the security information data from each data source comprising values of one or more security signals for the network system at each of a plurality of times in a period of time; receiving a plurality of metric definitions from each of a plurality of metric sources, wherein each metric definition defines a heuristic for calculating a score for the network system from one or more security signal values at a time in the plurality of times, wherein the score quantifies a security metric for the network system; calculating, for each metric definition, a respective score for the system for each time in the plurality of times, the calculating comprising, for each time, applying the metric definition to the security signal values at the time to calculate the respective score for the network system; comparing the scores for each metric over the period of time to identify one or more relationships between the plurality of metric definitions; and selecting metric definitions from the plurality of metric definitions according to the one or more relationships between the plurality of metric definitions, wherein the selected metric definitions are candidates to be key performance indicators for the network system, and wherein each key performance indicator is a metric definition that is related to the performance of and is indicative of one or more other metric definitions. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving security information data from each of a plurality of data sources for a network system of computers, the security information data from each data source comprising values of one or more security signals for the network system at each of a plurality of times in a period of time; receiving a plurality of metric definitions from each of a plurality of metric sources, wherein each metric definition defines a heuristic for calculating a score for the network system from one or more security signal values at a time in the plurality of times, wherein the score quantifies a security metric for the network system; calculating, for each metric definition, a respective score for the system for each time in the plurality of times, the calculating comprising, for each time, applying the metric definition to the security signal values at the time to calculate the respective score for the network system; comparing the scores for the metrics over the period of time to identify one or more relationships between the plurality of metric definitions; presenting a graphical representation of one or more of the identified relationships to a user. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Users can identify a few key performance indicators that indicate the overall security of their system, rather than having to analyze numerous system security metrics. Key performance indicators are metrics that are identified as being important to represent the state of the environment, and help identify important data within a sea of unimportant metrics. Key performance indicators that correlate well with many system security metrics can be used. This reduces the number of security metrics a user has to follow and interpret. Key performance indicators can be selected from security metrics that are customized to the system itself, or user preferences, rather than from off-the-shelf security metrics. Users can visualize and better understand relationships between different security metrics, which facilitates interpretation of the data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Asset System Overview

Figure 1:
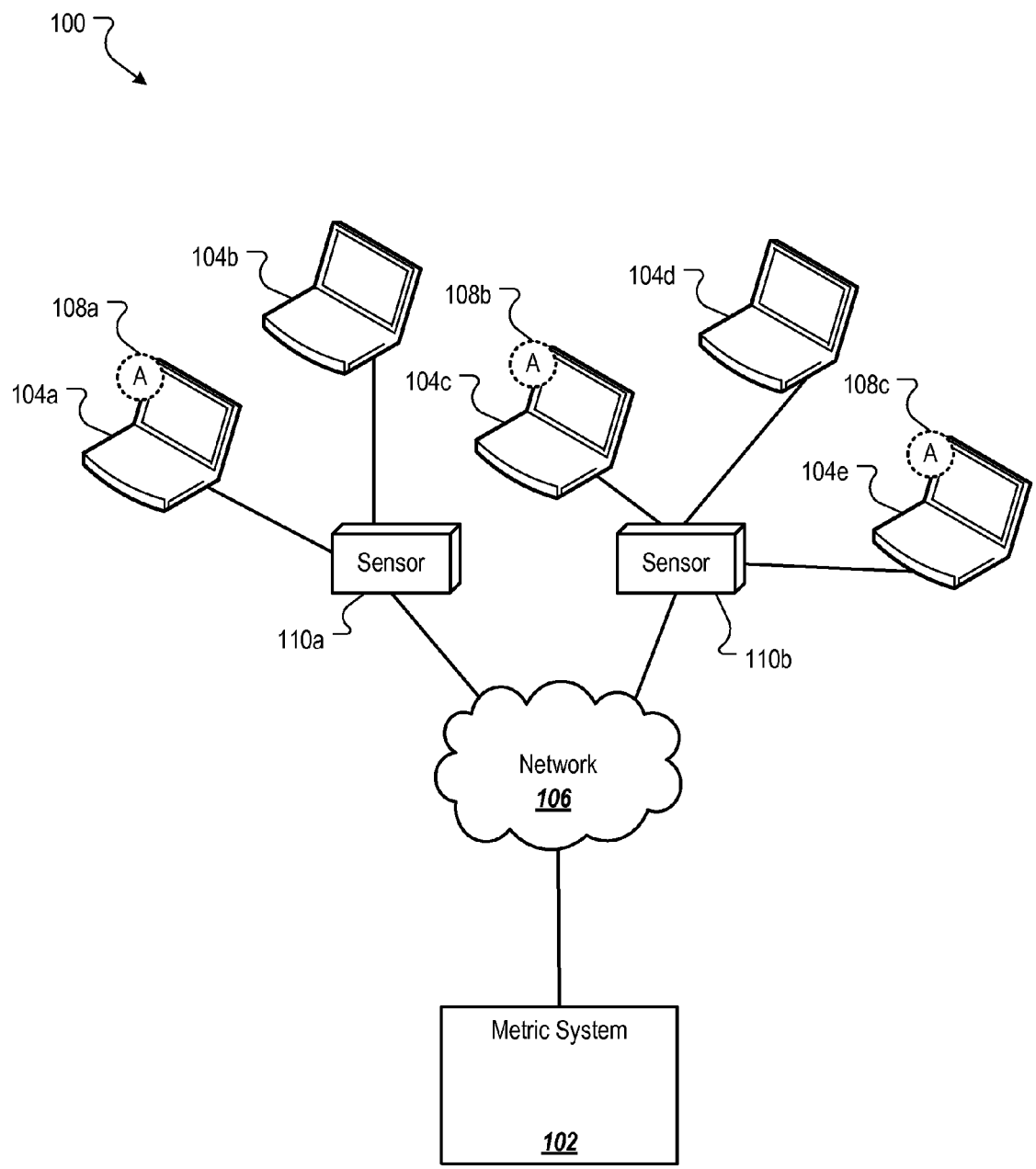
FIG. 1 illustrates an example asset system monitored by a metric system.

FIG. 1 illustrates an example asset system 100 monitored by a metric system 102. The assets 104 in the system 100 are connected to each other, and optionally to other systems, by a network 106.

Each asset 104 can be vulnerable to one or more threats, e.g., possible attacks. These threats include, for example, viruses, malware, and other unauthorized attacks. Each asset can be protected by a variety of countermeasures including passive countermeasures and active countermeasures.

The assets are monitored by agent-based sensors 108 and network-based sensors 110. For example, agent-based sensor 108a is installed on asset 104a, agent-based sensor 108b is installed on asset 104c, and agent-based sensor 108c is installed on asset 104e. The agent-based sensors 108 run various analyses on their respective assets 104, for example, to identify vulnerabilities on the assets 104 or to identify viruses or other malware executing on the assets 104. The agent-based sensors 108 can also generate other data about the assets or the operation of the assets, for example, a number of suspicious programs operating on a user computer asset at a given time, a number of spam e-mails an e-mail server asset detects in a given day, etc. Agent based sensors can also detect additional features, states and software, such as improper configuration, missing patches, malware, asset information (OS, network connectivity), user information, weak passwords, improper file or directory permissions, etc. Example agent-based sensors include antivirus software, host intrusion prevention software, configuration management software that precludes changing of certain files, file integrity monitors, network access control software that controls access to a network, etc. These features can be implemented in separate software components or bundled into several (or even one) software component.

The network-based sensors 110 are hardware devices and/or software in a data communication path between assets 104 protected by the sensor and the network resources that the asset is attempting to access. For example, sensor 110a is connected to assets 104a and 104b, and sensor 110b is connected to assets 104c, 104d, and 104e. While FIG. 1 illustrates a single network-based sensor 110 in a communication path with each asset, other configurations are possible. For example, multiple network-based sensors 110 can be connected to the same asset 104, and some assets 104 may not be connected to any network-based sensors 110.

An example network-based sensor includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query a sensor control system (not shown) and take further actions as instructed by the metric system 102. Example network based sensors include network access control systems, firewalls, routers, switches, bridges, hubs, web proxies, application proxies, gateways, mail filters, virtual private networks, intrusion prevention systems and intrusion detection systems, etc.

When an asset 104 tries to send information through the network 106 or receive information over the network 106 through a network-based sensor 110, the sensor analyzes information about the asset 104 and the information being sent or received and generates data about the information. The network-based sensor also determines whether to allow the communication.

The overall security of the asset system 100 depends on the overall security of the individual assets in the system. However, quantitatively measuring the security of an asset system can be difficult. Different security metrics will often give different pictures of a system's security. To help system administrators (and other users) gain a manageable sense of their system's security, the metric system 102 evaluates relationships between various security metrics and identifies one or more key performance indicators from the metric definitions. Each key performance indicator is a metric definition that represents the security of the network system as a whole, e.g., represents a metric definition that is related to the performance of other metrics in a way that the key performance indicator is indicative of the one or more other metrics. The metric system 102 also allows users to visualize relationships, e.g., correlations, between different security metrics. This can help users develop an intuitive understanding of relationships between security metrics.

§2.0 Example Data Sources for Key Performance Indicator Selection

Figure 2:
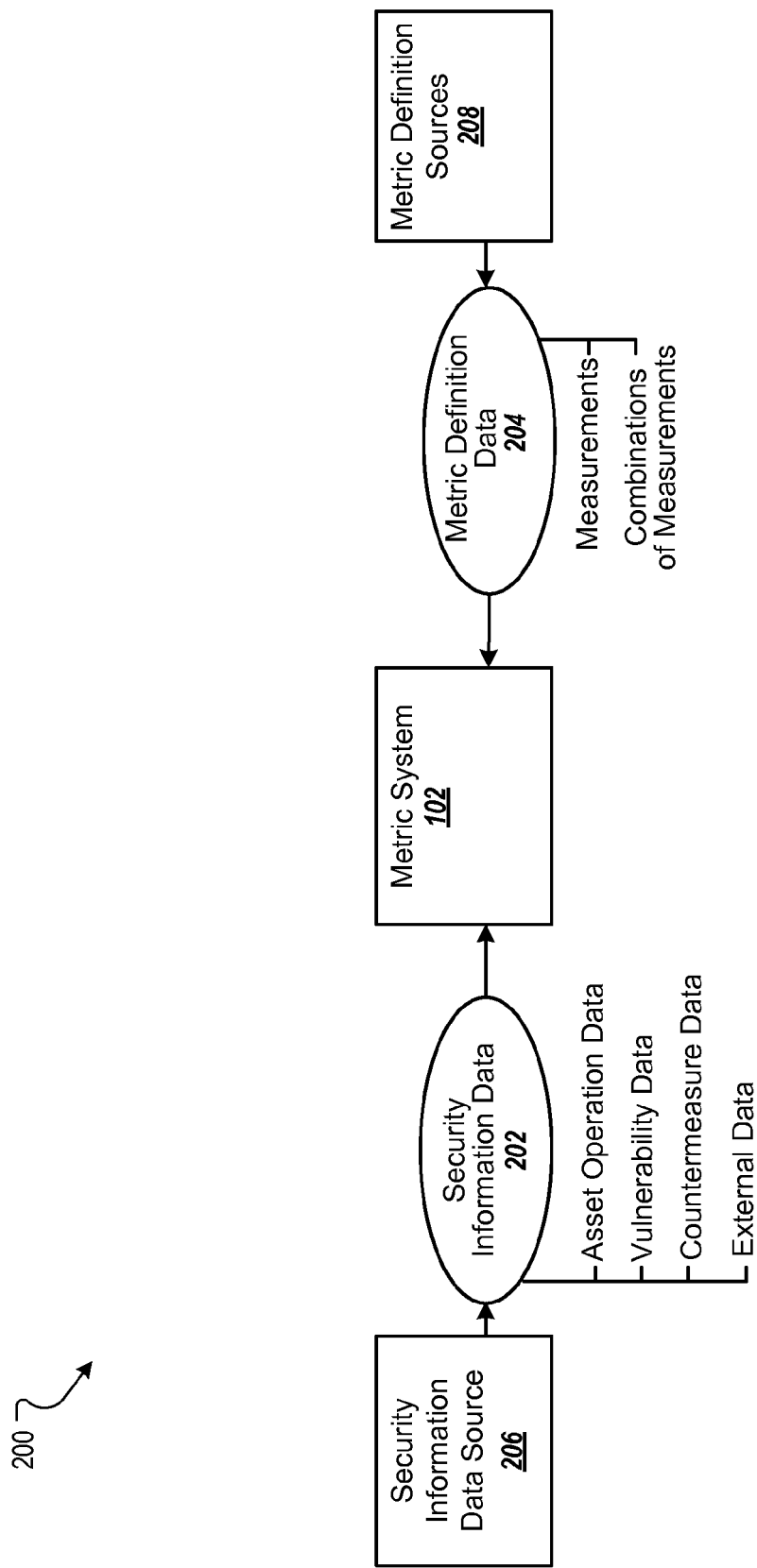
FIG. 2 illustrates an example of the data used by the metric system and the sources of the data used by the metric system.

FIG. 2 illustrates an example of the data used by the metric system 102 and the sources of the data used by the metric system 102. The metric system 102 receives security information data 202 and metric definition data 204 from various sources to determine the key performance indicators. The metric system receives the security information data 202 from security information data sources 206 and receives the metric definitions 204 from metric definition sources 208. The security information data 202 includes values of one or more security signals for the system over time, and the metric definitions 204 define heuristics for calculating a score for the network system for one or more security signals at a particular time. The score quantifies a security metric for the network system. Security information data 202 and metric definitions 204 are described in more detail below.

§2.1.1 Security Information Data

The security information data 202 is data describing one or more aspects of assets in the system. The security information data 202 can be data specific to individual assets, groups of assets, or the system of assets as a whole. For example, the security information data 202 can be data describing the operation of the assets, e.g., details on the number of viruses found on assets or the number of spam e-mails received by assets. The security information data 202 can also be data describing vulnerabilities detected on assets in the system, or data describing countermeasures protecting assets in the system. The security information data 202 can also be external data describing aspects of the assets in the system that are external to the system itself, for example, how much insurance there is for particular assets in the system.

The security information data 202 is received from one or more security information data sources 206. In some implementations, the security information data sources 206 are one or more data aggregators. A data aggregator is one or more servers that receive security information data, aggregate the data, and format the data in a format useable by the metric system 102. The data aggregators can receive security information data from the assets themselves or from the sensors monitoring the assets. Example data aggregators include Mcafee ePolicy Orchestrator®, available from McAfee of Santa Clara, Calif., and Active Directory®, available from Microsoft Corporation of Redmond, Wash. Alternatively, the security information data source(s) 206 are the assets and/or sensors themselves.

The security information data sources 206 can be internal security information data sources, external security information data sources, or both internal and external security information data sources. Internal security information data sources are sources provided by a same provider as the provider of the metric system 102. For example, if the metric system is a product sold by Company A, then any security information data sources also produced by Company A would be internal security information data sources. External security information data sources are sources provided by a different provider than the provider of the metric system 102. For example, if the metric system is a product sold by Company A, then any security information data sources not produced by Company A would be external security information data sources.

In some implementations, the system receives data from external data sources using different protocols than the protocols the system uses to receive data from internal data sources. For example, the system can automatically receive data pushed from internal data sources, whenever the internal data sources want to send the data, and can pull data from external data sources only when the monitoring system 102 needs additional data.

In some implementations, before the system accepts security information data received from a security information data source 206, the system authenticates the security information data source 206, for example using conventional authorization techniques, to confirm that the security information data source 206 is authorized to send data to the metric system 102.

§2.1.2 Security Metric Definition Data

The metric definition data 204 is received from one or more metric definition sources 208. The metric definition data 204 defines one or more security metrics by use of metric definitions. Each security metric has a value that is a measurement, or a value derived from multiple measurements, that quantifies the security of the system. The security metrics are generally designed to measure the overall security provided within the system, as opposed to the security provided by any particular sensor or countermeasure active on the network. The security metrics are used to measure the overall security of the system, and can be either pre-defined, customized, or a combination of both. Example metric definitions are the number of vulnerabilities detected on a system, the number of remediations applied to assets in the system, the number of times assets in the system have been hacked, the number of times spam e-mails have been received by assets in the system, and combinations of these, for example, the number of vulnerabilities detected on a system minus the number of remediations applied to assets in the system.

The security metrics, and, in turn, their corresponding metric definitions, can be hierarchical. A security metric, as defined by its corresponding definition, can take into account security information data to generate a metric score or value (e.g., the percentage of detected spam emails for every 1,000 e-mails). Likewise, a security metric can also take into account scores for other security metrics to generate a metric score or value (e.g., an e-mail security health metric can take into account security metrics related to spam, phishing, and infected e-mail attachments).

Each security metric is a measurement that describes the state of some facet of security. A security metric, taken independently and in the absence of a hierarchal relation to other security metrics, often does not convey an overall security state. Accordingly, combining security metrics (either to generate a new combined metric value, or to visualize in combination) often convey more readily the actual security posture of an overall system. By way of another example, when phishing email levels grow past a certain threshold, then host intrusion detections also go up, firewall blocking rate increases, as do attacks on financial web services.

As will be discussed in more detail below, the analysis of various metrics results in the identification of a positive or negative correlation of the certain metrics. While correlation does not necessarily equate to causation, presentation of the metrics that are correlated can help security administrators understand the overall behavior of the security system, and help guide administers when determining where to allocate investigative and remedial resources.

The metric definitions include metadata about a metric it defines and instructions that cause a processing device to calculate a metric value (score) that measures the metric. The metric definition can be specified in various ways. For example, in some implementations, the metric definitions are executable program code that access the security information data 202 using an Application Programming Interface (API) provided by the metric system 102. The API specifies commands that the metric definition programs can invoke. In some implementations, different API commands are accessible to metric definitions received from different metric data sources. For example, the metric system 102 can assign a level of trust to each of the metric data sources 208, and only allow metric definitions from metric data sources 208 having a level of trust above a threshold to access particular API commands.

In other implementations, the metric definitions are specified in a script that can be executed by the metric system 102. In some implementations, the script is specified by a user. In other implementations, a user enters desired values and operations into a web browser, which automatically generates the script based on the user input.

In still other implementations, the metric definitions are defined using XML or an XML-like language with pre-defined operands and data sources. In some implementations, the metric definitions are specified using XML transforms.

The scripts, schemas, and other constructs for defining metric definitions take into account the security information data 202 available. For example, the security information data 202 can be defined to conform to a schema or standard (e.g., certain fields and values for representing risks, attacks, exploits, and their corresponding types), and, using the common scheme or standard, users can generate the corresponding metric definitions.

In some implementations, the system authenticates the metric definition sources 208 before receiving metric definitions from the metric definition sources, for example, much as the system authenticates security information data sources 206 before receiving security information data 202.

In some implementations, the system uses combinations of conventional validation and authentication and access control techniques to validate and verify metric definitions before using them. This helps protect the metric system 102 from malicious instructions that could be embedded in metric definitions.

As described above, the metric definitions, and corresponding metric dependencies according to a metric hierarchy, can be defined by users. Many users will often be interested in similar metrics. Accordingly, in some implementations, a metric definition source can be a security service provider that provides pre-defined metric definitions. By using pre-defined metric definitions, the system 102 is initially aware of which metrics correlated with other metrics based on previously performed observation (e.g., based on analysis by the security provider) or prior knowledge of the definition. In some implementations, the security provider provides definitions as content and releases the metric definitions to customers by a metric stream, e.g., a service through which a customer periodically receives predefined definitions and updates to the predefined definitions periodically.

In some implementations, the system 102 can report key performance indicators to the metric definition data source, e.g., a security provider. The security provider can, for example, aggregate the key performance indicator across industries and verticals, and provide the aggregated data to entity customers that use the system 102. Each entity can the compare its system performance against industry performance. The industry data collected from customers is anonymized to insure that no identifying information is provided with the data that can be tracked back to an individual customer.

§3.0 Example Process for Selecting Candidate Key Performance Indicators

The metric system 102 can help users, such as system administrators, understand the security of their system, identify the best security metrics for their system, and understand relationships between the security metrics in various ways. For example, the metric system 102 can identify candidate key performance indicators or can present visual representations of relationships between security metrics.

§3.1 Example Process for Selecting Candidate Key Performance Indicators

Figure 3:
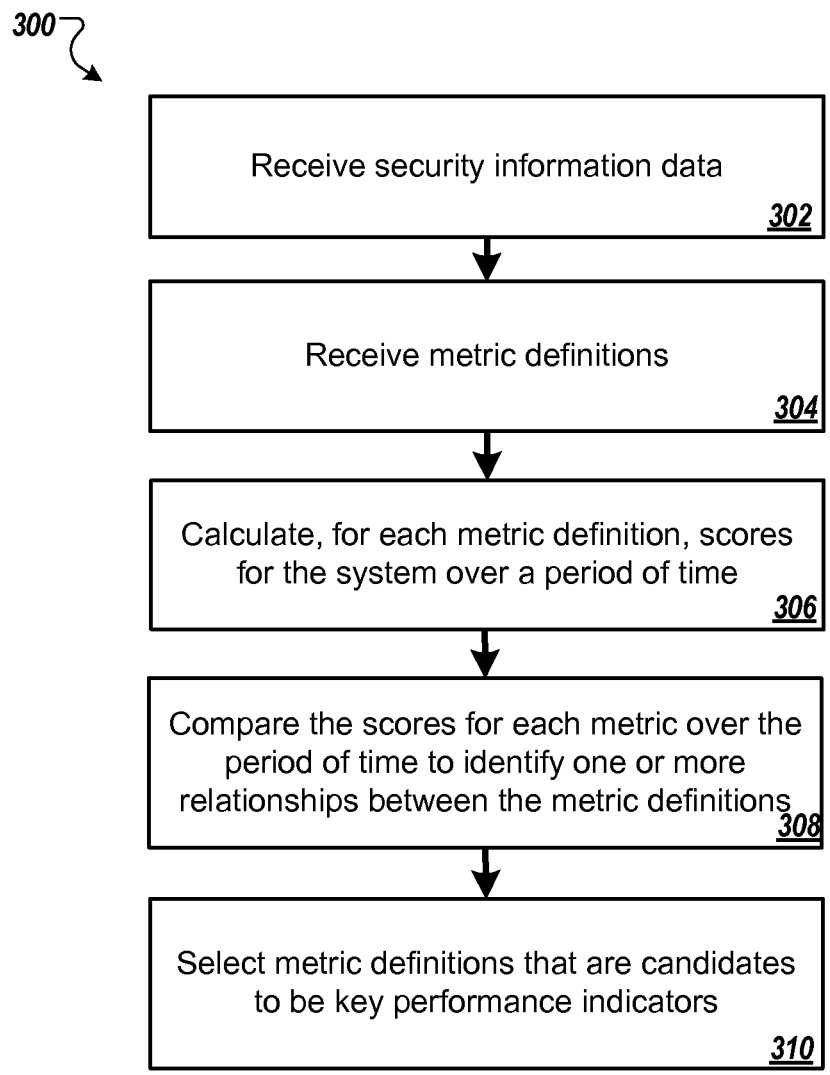
FIG. 3 is a flow diagram of an example process for selecting candidate key performance indicators from metric definitions.

FIG. 3 is a flow diagram of an example process 300 for selecting candidate key performance indicators from metric definitions. The process can be implemented by a system of one or more computers, for example, by the metric system 102.

The process 300 receives security information data (302), for example, as described above with reference to FIG. 2. The process 300 receives metric definitions (304), for example, as described above with reference to FIG. 2.

The process calculates, for each metric definition, scores for the system over a period of time (306). The process calculates the score for a metric definition at a given time by applying the metric definition to security signals in the security information data from the given time. For example, if the metric definition is represented by executable code, the process executes the code. If the metric definition is represented by a script, the process executes the script. If the metric definition is represented using an XML file, the process interprets the XML file.

The process compares the scores for each metric over the period of time to identify one or more relationships between the metric definitions (308). In some implementations, the relationships between the metric definitions are determined by determining correlations between two or more security metrics. The correlations can be positive or negative correlations. In other implementations, other functions can be used to determine the relationships between security metrics corresponding to the metric definitions over time. For example, user-specified functions, received for example, through a user interface, can be used.

In some implementations, the system 102 performs phase-aware correlations in which metrics are time shifted and correlation measurements are calculated for each time shift. The phase-aware correlation can detect metrics that appear uncorrelated with respect to a same time reference, but are, in fact, correlated when one of the metrics is time shifted with respect to the other.

The system 102 can also take into account metric dependencies to detect false-positive correlations. For example, two metrics may be combined to define a combined metric that is explicitly dependent on the two metrics, i.e., the combined metric is explicitly defined by a function of the two metrics. The system 102 accounts for the metric dependencies so that false positive and false negatives are detected or avoided (e.g., a combined metric is not compared to its dependent metrics, for example). In other words, a metric definition that may be a key performance indicator is positively or negatively correlated to one or more other metric definitions, but is not explicitly dependent on the one or more other metric definitions with which it is positively or negatively correlated.

A variety of correlation techniques and correlations measurements can be used.

The process selects metric definitions that are candidates to be key performance indicators (310). A key performance indicator is a metric definition that represents the security of the network system as a whole, or are indicative of representing an important state of an environment. Typically a key performance indicator is a metric (or set of metrics) that exhibit a strong positive or negative correlation. For example, the process 300 can identify metric definitions that are strongly correlated with many other metric definitions. The process 300 can also identify metric definitions that are used by other companies in the same industry as the company whose asset system is being monitored, or metric definitions that are strongly related to metric definitions that are used by other companies in the same industry.

In some implementations, the process 300 receives data from a user that specifies particular security metrics that are of interest to the user. The process 300 then identifies candidate key performance indicators by identifying security metrics that are strongly related to the security metrics specified by the user. For example, the process 300 can identify security metrics that are strongly correlated with the security metrics specified by the user, or that are strongly correlated but tend to change before the security metrics specified by the user. For example, if the user specifies security metric A, and security metric B always changes a day before security metric A changes, the process could identify security metric B as a candidate key performance indicator.

To illustrate a more concrete example, assume attacks on financial web services are an important security metric for a particular entity. When phishing e-mail levels grow past a certain threshold, then host intrusion detections also go up, firewall blocking rate increases, as do attacks on financial web services. Accordingly, the key performance indictors would be the metrics for phishing e-mail levels, and possibly host intrusion detection and firewall blocking rates.

In some implementations, after the process 300 selects metric definitions that are candidates to be key performance indicators, the system presents the candidate key performance indicators to a user. For example, the process can present a name of each candidate key performance indicator along with values of the candidate key performance indicator over time. In some implementations, the process presents a graphical representation of the values of the candidate key performance indicators over time. The system can optionally present graphical representations of the values of other security metrics, for example, other security metrics correlated with the key performance indicator, alongside the graphical representation of the value of the key performance indicator over time.

After the user is presented with the candidate key performance indicators, the process 300 can receive user input selecting one or more of the selected metric definitions as the key performance indicators for the asset system. Alternatively, or in addition, the process 300 can receive user input selecting two or more of the candidate key performance indicators and requesting that a definition of a security metric resulting from a combination of the candidate key performance indicators be used as a key performance indicator.

Returning to the phishing e-mail example, a security administration would see that the phishing e-mail levels, host intrusion detections, and firewall blocking rates are candidate key performance indicators. The administrator examines the metrics and underlying security information data in more detail, and determines that the key performance indicator is indeed the phasing e-mail level metric. He or she then selects this metric as a key performance indictor for finance services attacks.

The metric system 102 can continue to monitor the specified key performance indicators and present their values to the user when requested by the user. In some implementations, the user specifies particular thresholds for the different key performance indicators, and the metric system 102 issues alerts to the user if the value of a key performance indicator rises above, or falls below, the specified threshold for the key performance indicator.

Figure 4:
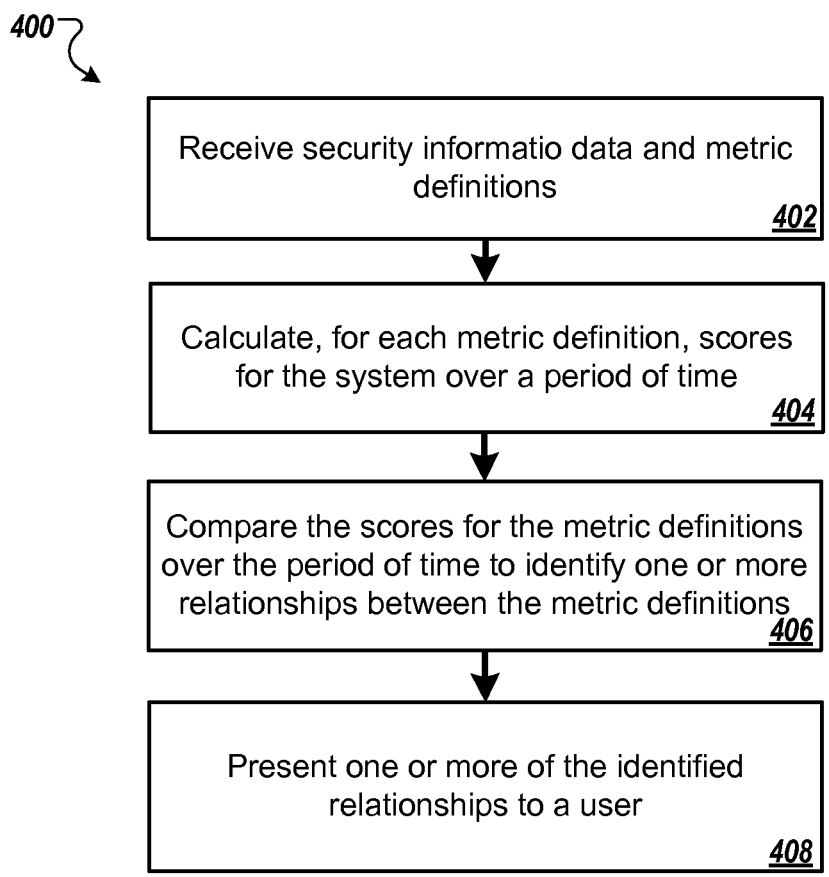
FIG. 4 is a flow diagram of an example process for identifying and presenting relationships between security metrics to users.

§3.2 Example Process for Identifying and Presenting Relationships Between Security Metrics to Users FIG. 4 is a flow diagram of an example process 400 for identifying and presenting relationships between security metrics to users. The process 400 can be implemented by a system of one or more computers, for example, by the metric system 102. The process 400 presents information about relationships between security metrics to users, instead of automatically identifying candidate key performance indicators, like the process 300 does.

The process receives security information data and metric definitions (402), for example, as described above with reference to FIGS. 2 and 3. The process calculates, for each metric definition, scores for the metric definition over a period of time (404), for example, as described above with reference to FIG. 3. The process compares the scores for the metric definitions over the period of time to identify one or more relationships between the metric definitions (406), for example, as described above with reference to FIG. 3. In some implementations, the system compares all of the metric definitions to each other in order to identify the one or more relationships. In other implementations, the system compares only metric definitions specified by a user. For example, the system could have twenty metric definitions, but if a user specified that he or she was only interested in the relationships between three particular metric definitions, the system would only compare the three metric definitions.

The process presents one or more of the identified relationships to a user (408). For example, if the system has identified a relationship between two security metrics, the system can present graphical representations of the values of the security metrics over time, and optionally include details regarding the relationship. An example detail of a relationship between two security metrics is a r-squared value for the correlation between two security metrics. Example graphical presentations are described in more detail below in Section 4.0.

§4.0 Example User Interfaces

Once the metric system 102 generates relationships between security metrics and identifies candidate key performance indicators, the metric system 102 can present the results of its analysis through various graphical user interfaces.

§4.1 Example Presentations of Candidate Key Performance Indicators

Figure 5A:
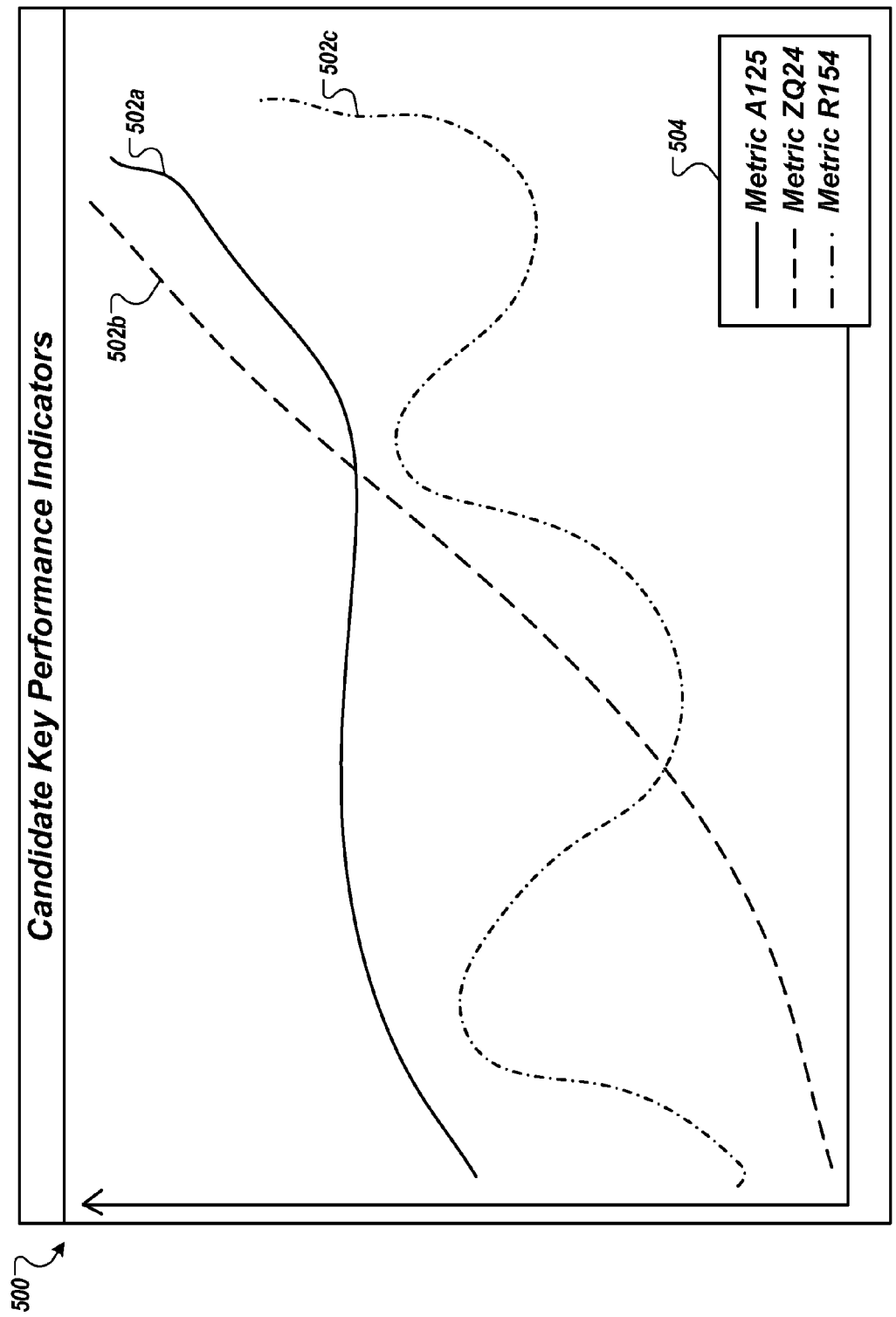
FIG. 5A is an example graphical user interface presenting three candidate key performance indicators.

FIG. 5A is an example graphical user interface 500 presenting three candidate key performance indicators (Metric A125, Metric ZQ24, and Metric R154). The user interface presents a graph with lines 502 corresponding to the values of each of the candidate key performance indicators over time. Users can select one or more of the candidate key performance indicators from the user interface, e.g., by selecting the name of the desired key performance indicators in the box 504.

Figure 5B:
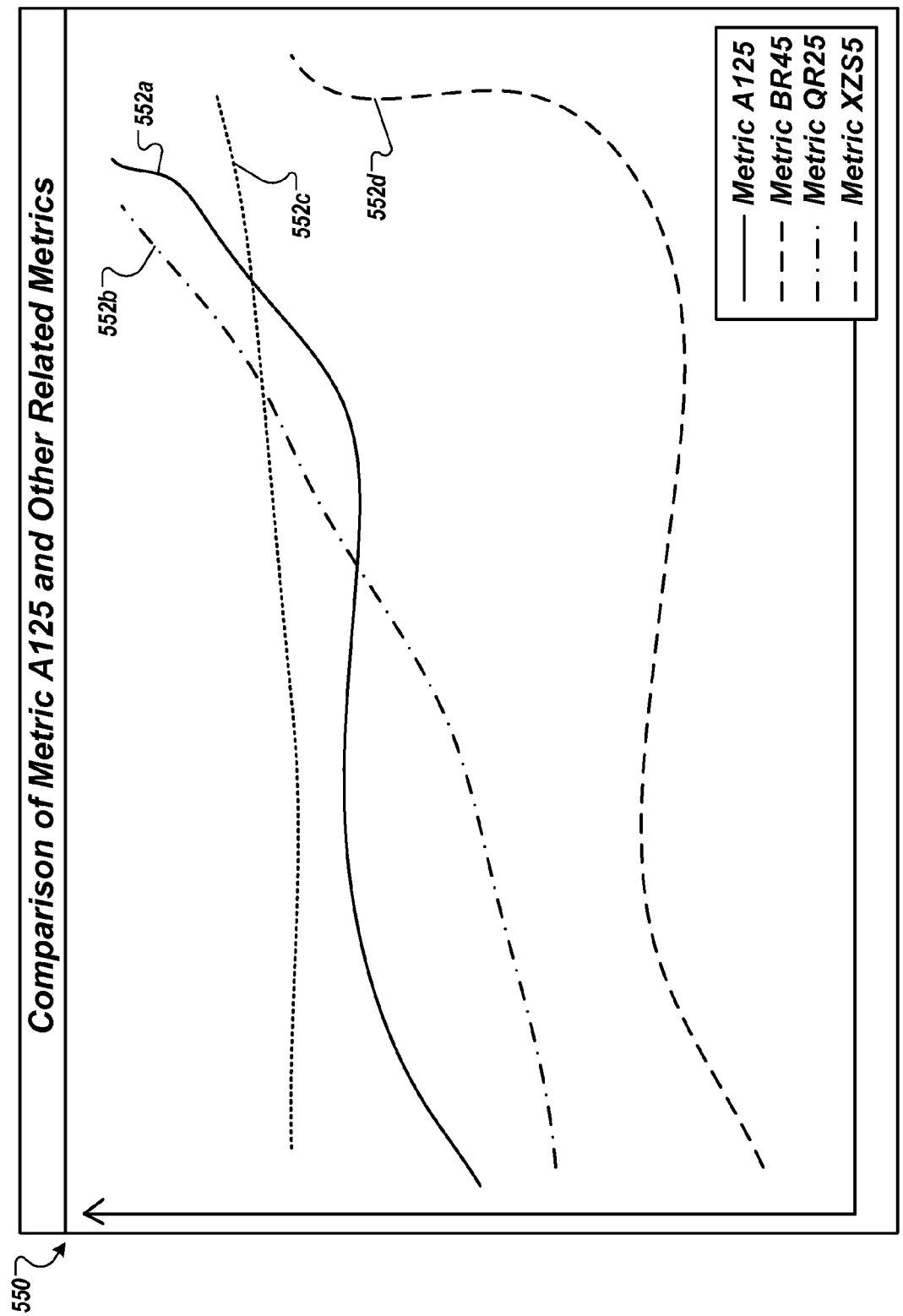
FIG. 5B is an example graphical user interface presenting a candidate key performance indicator along with three related security metrics.

FIG. 5B is an example graphical user interface 550 presenting candidate key performance indicator Metric A125 along with three related security metrics (Metric BR45, Metric QR25, and Metric XZS5). Each security metric is presented as a line 552 corresponding to the values of each of the security metrics over time. Users can use the graph presented in the user interface 550 to understand how the candidate key performance indicator (Metric A125) is related to other security metrics.

FIG. 5B is an example graphical user interface 550 presenting candidate key performance indicator Metric A125 along with three related security metrics (Metric BR45, Metric QR25, and Metric XZS5). Each security metric is presented as a line 552 corresponding to the values of each of the security metrics over time. Users can use the graph presented in the user interface 550 to understand how the candidate key performance indicator (Metric A125) is related to other security metrics.

Figure 5C:
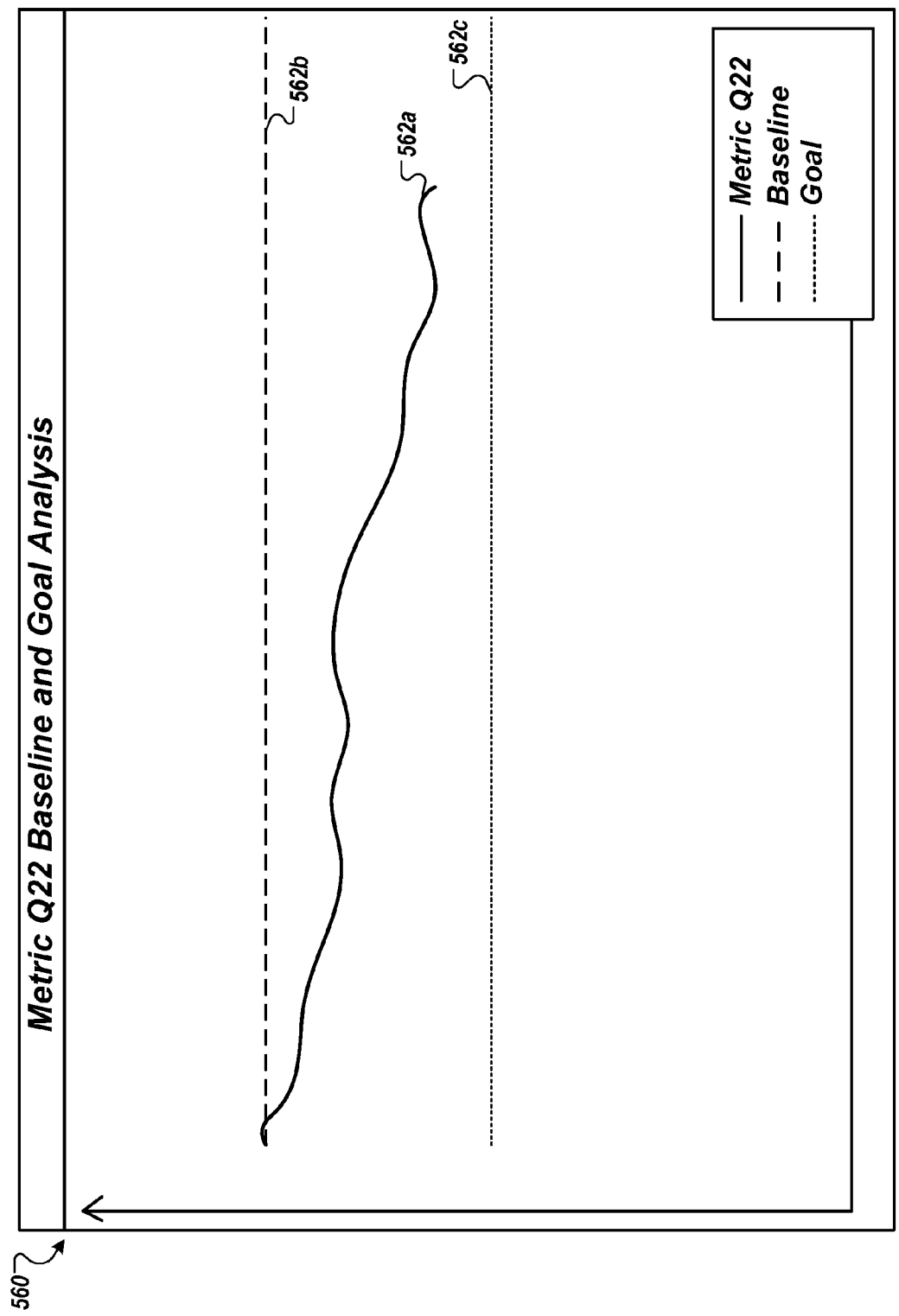
FIG. 5C is an example graphical user interface presenting a key performance indicator with baseline and goal reference points.

FIG. 5C is an example graphical user interface 560 presenting a key performance indicator Metric Q22 with baseline and goal reference points. The security metric is presented as a line 562a corresponding to the value of the security metric over time. Baseline and goal references are presented as lines 562b and 562c, respectively. The baseline is the starting point for the metric, e.g., when the metric was first measured or when the baseline has been reset. The goal is the target that the user is trying to achieve with the metric.

Figure 5D:
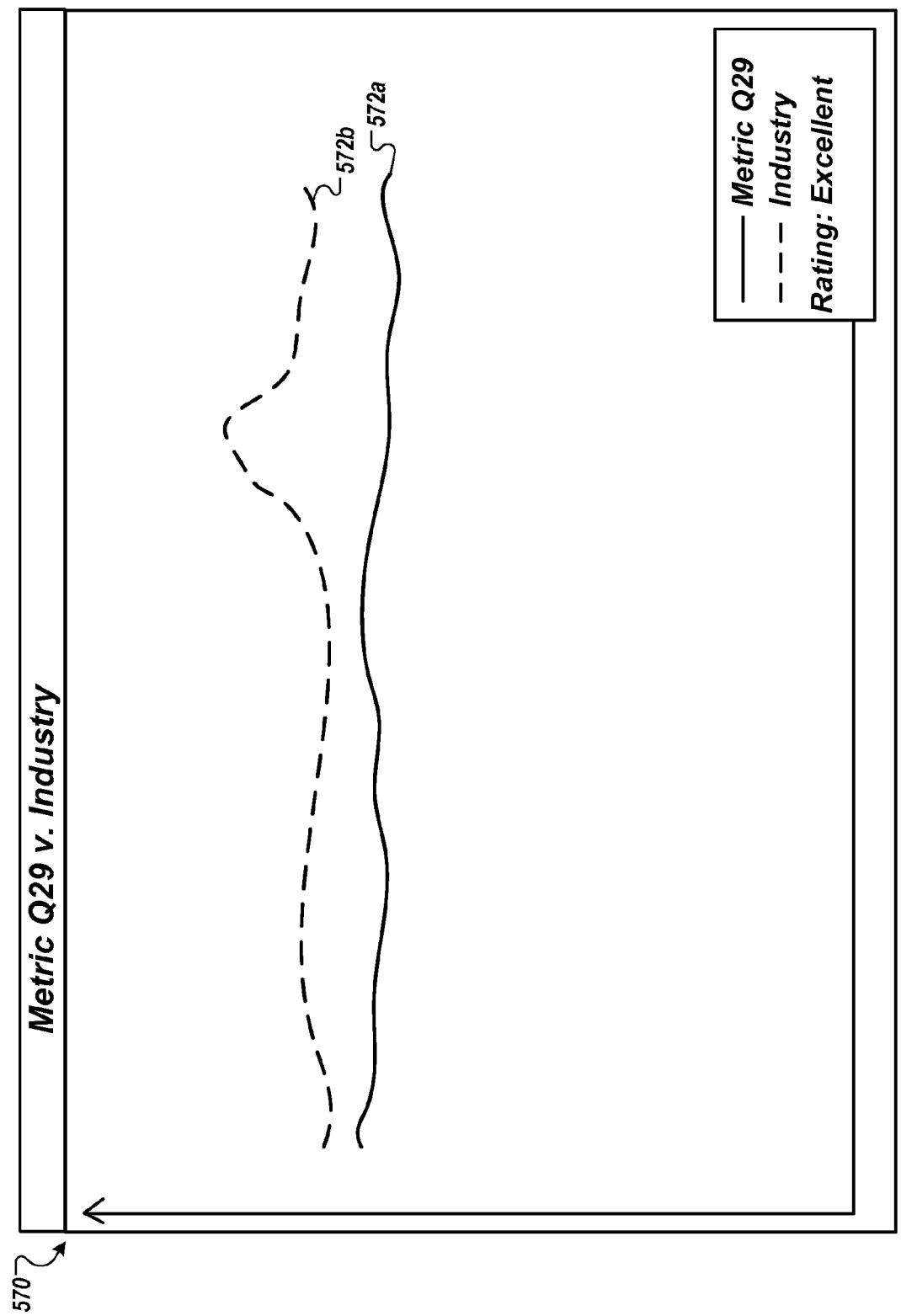
FIG. 5D is an example graphical user interface presenting a key performance indicator relative to an industry standard.

FIG. 5D is an example graphical user interface 570 presenting a key performance indicator Metric Q29 relative to an industry standard. Here, the metric Q29 is represented as a line 572a corresponding to the value of the security metric over time, and the aggregated industry standard over the same time is represented as a line 572b. In some implementations, the system 102 can determine a performance rating relative to an industry. In FIG. 5D, for example, the metric Q22 corresponds to virus infections. Note that the aggregate industry metric experienced a large increases for a certain period (e.g., as the result of a new virus), but the customer entity did not experience an abnormal number of infections. Furthermore, the customer entity has a much lower infection rate overall than compared to the industry. Accordingly, the customer entity has a rating of "Excellent" with respect to a virus infection rate.

§4.2 Example Presentations of Relationships Between Security Metrics

Figure 6:
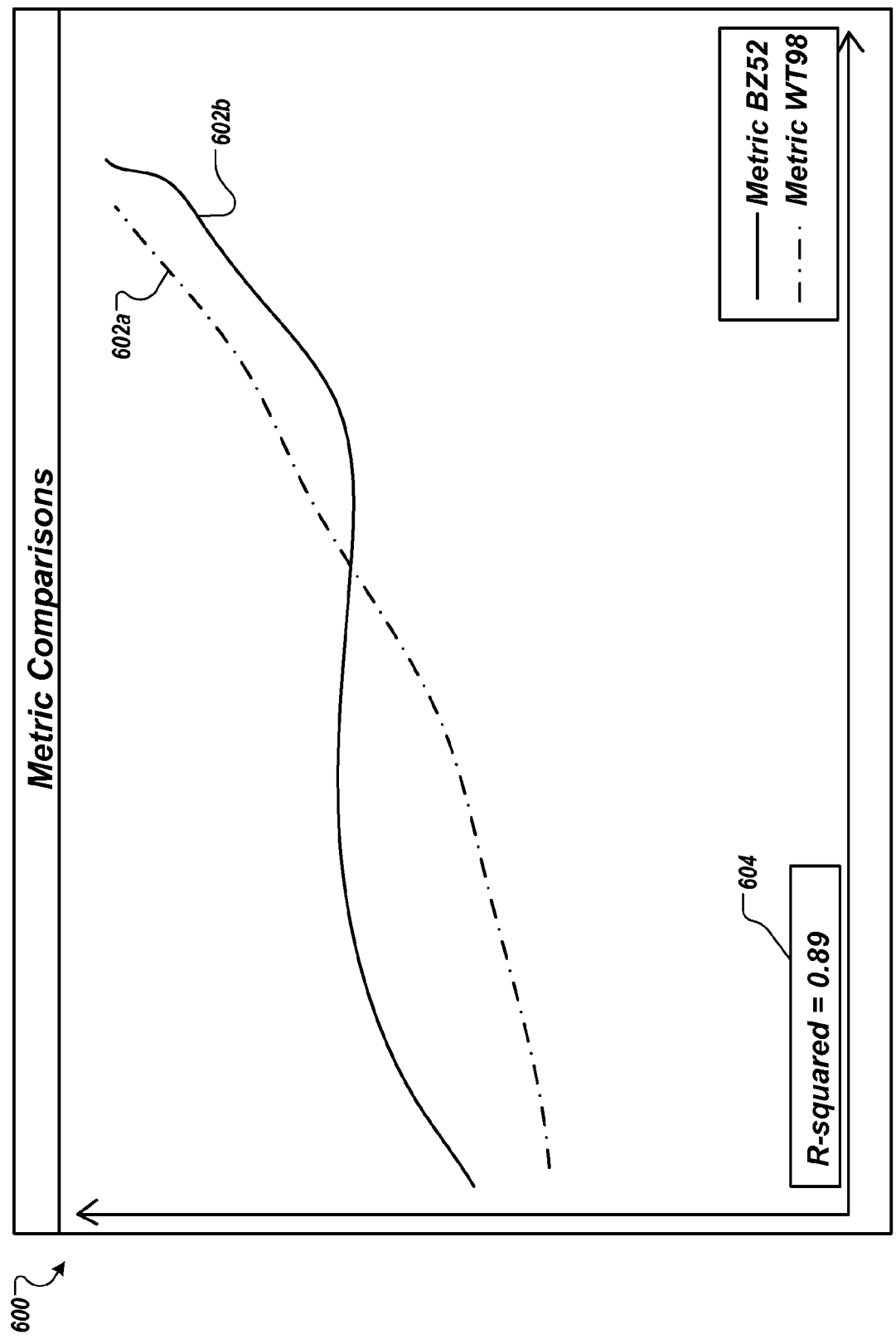
FIG. 6 is an example graphical user interface presenting two security metrics and details on the relationship between the two security metrics.

FIG. 6 is an example graphical user interface 600 presenting two security metrics (Metric BZ52 and Metric WT98) and details on the relationship between the two security metrics. The user interface presents a graph with lines 602 corresponding to the values of each of the security metrics over time. The user interface also presents details on the relationship between the two security metrics. In the example shown in FIG. 6, the relationship is a correlation, so the r-squared value 604 for the correlation is shown.

In some implementations, the presentation is a threat timeline presentation that illustrates how long the threat has been known, how long the remediation has been available, and how assets have had particular classifications. For example, if a threat was discovered at day zero, a patch was available at day five, an asset was categorized as patch urgently at day ten, remediations were applied to the asset and the asset was downgraded to patch later at day fifteen, the timeline could indicate each of those points in time. In some implementations, the timeline aggregates data for multiple assets, for example, to give system administrators an overview of how long it takes to fix known threats to the system.

§5.0 Additional Implementation Details

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. At least one non-transitory, machine accessible storage medium having instructions stored thereon, the instructions when executed on a machine, cause the machine to:
receive security information data from each of a plurality of data sources for a network system of computers, the security information data from each data source comprising values of one or more security signals for the network system at each of a plurality of times in a period of time;
receive a plurality of metric definitions from each of a plurality of metric sources, wherein each metric definition defines a heuristic for calculating a score for the network system from one or more security signal values at a time in the plurality of times, wherein the score quantifies a security metric for the network system;
calculate, for each metric definition, a respective score for the system for each time in the plurality of times, the calculating comprising, for each time, applying the metric definition to the security signal values at the time to calculate the respective score for the network system;
compare the scores for each metric over the period of time to identify one or more relationships between the plurality of metric definitions;
select a set of metric definitions from the plurality of metric definitions as candidates to be key performance indicators for security of the network system based on the one or more relationships between the plurality of metric definitions, wherein each key performance indicator is to represent a state of the network system and is to be indicative of one or more other metric definitions;
cause the set of metric definitions to be presented at a user interface as suggested candidates for selection as key performance indicators for the network system;
identify user selection, through the user interface, of one or more of the set of metric definitions as key performance indicators for the network system; and
define the selected one or more of the set of metric definitions as new key performance indicators for the network system based on the user selection.

2. The storage medium of claim 1, wherein the plurality of metric definitions include one or more user-defined metric definitions and one or more system-defined metric definitions.

3. The storage medium of claim 1, wherein the instructions, when executed on a machine, further cause the machine to:
generate a graphical representation of the scores for each of the set of metric definitions over time;
present the graphical representations to a user.

4. The storage medium of claim 1, wherein the one or more relationships include a correlation relationship.

5. The storage medium of claim 4, wherein the set of metric definitions are positively or negatively correlated to one or more other metric definitions, and wherein each metric definition is not explicitly dependent on the one or more other metric definitions with which it is positively correlated.

6. The storage medium of claim 1, further comprising receiving input from a user identifying one or more metric definitions of interest, wherein the set of metric definitions is to be selected according to identified relationships between the set of metric definitions and the one or more metric definitions of interest, wherein the new key performance indicators comprise key performance indicators corresponding to the metric definitions of interest.

7. At least one non-transitory, machine accessible storage medium having instructions stored thereon, the instructions when executed on a machine, cause the machine to:
receive security information data from each of a plurality of data sources for a network system of computers, the security information data from each data source comprising values of one or more security signals for the network system at each of a plurality of times in a period of time;
receive a plurality of metric definitions from each of a plurality of metric sources, wherein each metric definition defines a heuristic for calculating a score for the network system from one or more security signal values at a time in the plurality of times, wherein the score quantifies a security metric for the network system;
calculate, for each metric definition, a respective score for the system for each time in the plurality of times, the calculating comprising, for each time, applying the metric definition to the security signal values at the time to calculate the respective score for the network system;
compare the scores for the metrics over the period of time to identify one or more relationships between the plurality of metric definitions;
present a graphical representation of one or more of the identified relationships between two or more of the metric definitions to a user; and
receive a selection of at least one of the two or more metric definitions as a key performance indicator for the network system, wherein key performance indicators are to represent a corresponding state of the network system and are to be indicative of one or more other metric definitions; and
define the selected metric definitions as new key performance indicators for the network system based on the user selection.

8. The storage medium of claim 7, wherein the plurality of metric definitions include one or more user-defined metric definitions and one or more system-defined metric definitions.

9. The storage medium of claim 7, wherein comparing the scores for the metrics over the period of time comprises comparing the score of each metric to each other metric.

10. The storage medium of claim 7, wherein the instructions, when executed on a machine, further cause the machine to receive user input specifying two or more metric definitions of interest; wherein comparing the scores for the metrics over the period of time comprises comparing the scores for the metric definitions of interest.

11. The storage medium of claim 7, wherein the one or more relationships include correlation relationships.

12. A computer implemented method, comprising:
receiving, by a data processing apparatus, security information data from each of a plurality of data sources for a network system of computers, the security information data from each data source comprising values of one or more security signals for the network system at each of a plurality of times in a period of time;
receiving, by the data processing apparatus, a plurality of metric definitions from each of a plurality of metric sources, wherein each metric definition defines a heuristic for calculating a score for the network system from one or more security signal values at a time in the plurality of times, wherein the score quantifies a security metric for the network system;
calculating, by the data processing apparatus, for each metric definition, a respective score for the system for each time in the plurality of times, the calculating comprising, for each time, applying the metric definition to the security signal values at the time to calculate the respective score for the network system;
comparing, by the data processing apparatus, the scores for each metric over the period of time to identify one or more relationships between the plurality of metric definitions;
selecting, by the data processing apparatus, a set of metric definitions from the plurality of metric definitions as candidates to be key performance indicators for security of the network system based on the one or more relationships between the plurality of metric definitions, and wherein each key performance indicator is to represent a state of the network system and is to be indicative of one or more other metric definitions;
causing the set of metric definitions to be presented at a user interface as suggested candidates for selection as key performance indicators for the network system;
identifying user selection, through the user interface, of one or more of the set of metric definitions as key performance indicators for the network system; and
defining the selected one or more of the set of metric definitions as new key performance indicators for the network system based on the user selection.

13. The method of claim 12, wherein the plurality of metric definitions include one or more user-defined metric definitions and one or more system-defined metric definitions.

14. The method of claim 12, further comprising:
generating a graphical representation of the scores for each of the set of metric definitions over time;
presenting the graphical representations to a user.

15. The method of claim 12, wherein the one or more relationships include a correlation relationship.

16. The method of claim 15, wherein the set of metric definitions are positively or negatively correlated to one or more other metric definitions, and wherein each metric definition is not explicitly dependent on the one or more other metric definitions with which it is positively correlated.

17. A method, comprising:
receiving, by a data processing apparatus, security information data from each of a plurality of data sources for a network system of computers, the security information data from each data source comprising values of one or more security signals for the network system at each of a plurality of times in a period of time;
receiving, by the data processing apparatus, a plurality of metric definitions from each of a plurality of metric sources, wherein each metric definition defines a heuristic for calculating a score for the network system from one or more security signal values at a time in the plurality of times, wherein the score quantifies a security metric for the network system;
calculating, by the data processing apparatus, for each metric definition, a respective score for the system for each time in the plurality of times, the calculating comprising, for each time, applying the metric definition to the security signal values at the time to calculate the respective score for the network system;
comparing, by the data processing apparatus, the scores for the metrics over the period of time to identify one or more relationships between the plurality of metric definitions;
generating, by the data processing apparatus, data for a graphical representation of one or more of the identified relationships between two or more of the metric definitions to a user;
receiving a selection of at least one of the two or more metric definitions as a key performance indicator for the network system, wherein key performance indicators are to represent a corresponding state of the network system and are to be indicative of one or more other metric definitions; and
defining the selected metric definitions as new key performance indicators for the network system based on the user selection.

18. The method of claim 17, wherein the plurality of metric definitions include one or more user-defined metric definitions and one or more system-defined metric definitions.

19. The method of claim 17, wherein comparing the scores for the metrics over the period of time comprises comparing the score of each metric to each other metric.

20. The method of claim 17, further comprising receiving user input specifying two or more metric definitions of interest; wherein comparing the scores for the metrics over the period of time comprises comparing the scores for the metric definitions of interest.

21. The method of claim 17, wherein the one or more relationships include correlation relationships.

* * * * *